United States Patent [19]

Bieler et al.

[11] 4,127,688
[45] Nov. 28, 1978

[54] SEALED CROSS-LINKED THERMOPLASTIC SHEETS

[75] Inventors: Anne C. Bieler, Mauldin; Milton A. Howe, Jr., Spartanburg, both of S.C.

[73] Assignee: W. R. Grace & Co., Duncan, S.C.

[21] Appl. No.: 792,177

[22] Filed: Apr. 29, 1977

Related U.S. Application Data

[62] Division of Ser. No. 753,038, Dec. 22, 1976.

[51] Int. Cl.² ...................... B65D 85/30; B32B 27/08
[52] U.S. Cl. .................................... 428/36; 428/515; 428/516; 428/520; 428/420; 156/272; 206/484; 206/497
[58] Field of Search ................. 428/36, 515, 420, 516, 428/520; 156/272

[56] References Cited

U.S. PATENT DOCUMENTS

| | | | |
|---|---|---|---|
| 3,617,419 | 11/1971 | Fischer | 428/516 X |
| 3,936,565 | 2/1976 | Good | 428/516 X |
| 3,997,385 | 12/1976 | Osborne | 156/272 |

FOREIGN PATENT DOCUMENTS

| | | | |
|---|---|---|---|
| 572,948 | 5/1959 | Belgium | 425/516 |
| 1,380,480 | 10/1964 | France | 428/515 |

Primary Examiner—P. C. Ives
Attorney, Agent, or Firm—John J. Toney; William D. Lee, Jr.; John B. Hardaway

[57] ABSTRACT

The strength of a heat seal which bonds irradiatively cross-linkable thermoplastic materials together can be significantly improved by irradiating the seal area after sealing is completed. This technique is especially effective for improving the seal strength of packaging film laminates such as those having a layer of saran and a layer of ethylene vinyl acetate copolymer.

2 Claims, No Drawings

SEALED CROSS-LINKED THERMOPLASTIC SHEETS

This is a division of application Ser. No. 753,038, filed Dec. 22, 1976.

FIELD OF THE INVENTION

This invention relates to sealing irradiatively cross-linkable thermoplastic materials together, particularly multi-layer thermoplastic sheet material in which one of the layers is an ethylene vinyl acetate copolymer material.

BACKGROUND OF THE INVENTION

In the flexible packaging industry the use of thermoplastic sheet materials to package or enclose various products often requires the sealing together of the sheet materials by adhesives or heat to make a complete package. However, seal integrity becomes difficult to achieve and maintain when the package is subjected to abusive handling and to media of differing temperatures. This is particularly true in certain thermoplastic materials which seal readily but form seals weaker than are desired. Such seals often occur when polyethylene or ethylene vinyl acetate copolymer materials (hereinafter called "EVA") are joined.

Single layer, self-supporting films may be made from polyethylene or from EVA or a layer or layers of a laminate may be made from polyethylene or EVA; and, sometimes, it is desirable that the polyethylene or EVA layer of a laminate be crosslinked chemically or irradiatively to improve the strength properties thereof. However, no matter how strong a packaging film is, obviously a package made from film is no stronger than the film seals. Thus, it is one object of the subject invention to provide a method of strengthening the seals of cross-linkable packaging materials.

To produce a seal, certain prior art patents have suggested that prior to any sealing that the area to be sealed be irradiated so that the effects of radiation alone produce the seal. For example, in U.S. Pat. No. 2,997,419 which issued on Aug. 22, 1961 to E. J. Lawton, two sheets of polyester material are welded together by irradiating the contacting sheets with high energy electrons but the energy from the electrons alone is responsible for the welding of the polyester. Accordingly, it is another object of the present invention to enhance the strength of a seal previously formed by heat between thermoplastic materials. In another prior art patent, U.S. Pat. No. 2,936,261 which issued on May 10, 1960 to Q. P. Cole, a method of sealing together irradiated polyethylene sheets is described wherein the sealing is achieved by interposing a polymeric material between the layers which has a curing or cross-linking agent therein. However, it is an object of the present invention to improve the strength of heat seals between thermoplastic materials without the use of intermediate compounds or materials.

These and other objects are achieved by the present invention which is described below.

SUMMARY OF THE INVENTION

In one aspect, the subject invention is an improvement in the method of sealing cross-linkable thermoplastic materials together which comprises sealing or welding the materials together with heat or thermal energy and then irradiating the sealed area with ionizing radiation thereby increasing the strength of the seal.

In another aspect, the subject invention is a method of sealing polyethylene or ethylene vinyl acetate copolymer materials comprising the steps of sealing at least two sheets of said materials together under heat and pressure; and, irradiating the area of the seal with ionizing radiation to a dosage level equivalent to at least 2 MR.

In still another aspect, the subject invention is a shaped article such as a tube, sheet, etc. comprising: polyethylene or ethylene vinyl acetate copolymer materials; a seal area where at least two of said materials are sealed together or a single piece of one of said materials is sealed to itself; and, the material or materials within said seal area are cross-linked to a greater degree than the remainder of said material or materials.

DETAILED DESCRIPTION OF THE INVENTION

A useful thermoplastic film laminate in the packaging field is one which has a layer of polyethylene or ethylene vinyl acetate copolymer (hereinafter referred to as "EVA") and a layer of saran laminated thereto. Typically, the vinyl acetate content of the ethylene vinyl acetate copolymer layer may range from as low as 2 or 3% to as high as 25 to 30% or more depending upon the desired packaging application. In order to strengthen polyethylene or ethylene vinyl acetate copolymer layers and to render them heat shrinkable after stretch orientation it has been necessary to cross-link the polyethylene or ethylene vinyl acetate copolymer material preferably by irradiating the materials with high energy electrons.

A laminate structure having a polyethylene or EVA copolymer layer will, in most instances, have layers arranged such that an outer polyethylene or EVA layer can be heat sealed to another polyethylene or EVA layer, and the means of sealing will generally be heat sealing under pressure. If, as often occurs in the manufacturing process, a heat sealable layer is produced which is not uniform in thickness, the strength of the heat seal is adversely affected particularly where the heat seal layer is too thin so that a defective seal resulting in delamination occurs.

It has now been surprisingly found that when cross-linkable thermoplastic materials are sealed together by conventional methods and subsequently exposed to ionizing radiation that the seal strength is significantly improved even where the heat sealable, cross-linkable layer may be non-uniform in thickness. In some of the examples that follow, the cross-linkable material has been irradiated and cross-linked prior to sealing, so, to distinguish seals according to the present invention, they are referred to as "post irradiation" seals as the seal has been irradiated after the material was irradiated and/or after the seal is formed. Electron irradiation of polymeric materials is well known in the art but the irradiation or post irradiation of specific seal areas is a novel process and results in seals stronger than are obtainable by any currently practiced method.

To determine what radiation dosage level is necessary to achieve a satisfactory seal, bags were made from tubular laminates by flattening the tube and heat sealing the flattened tube transversely and then severing the tube behind the seal. One tubular laminate had a layer structure as follows: irradiated EVA copolymer/saran/EVA copolymer. The irradiated EVA layer formed the inside wall of the tube and this layer was sealed to itself. In another tubular laminate having two layers, the inside wall was EVA copolymer and the outside wall was saran so that an unirradiated EVA layer was sealed to itself. The heat sealing was performed by clamping the flattened tubing between two resistance heated sealing jaws with the final seal energy being induced into the clamped tubing or film by means of radio-frequency waves. This method is also referred to as dielectric heat sealing and is well known in the art and is used commercially where rapid sealing is desired.

Bags made according to the foregoing method were inflated to an internal pressure of 2 inches H$_2$O above atmosphere then immersed in 176° F. water for 30 seconds. The pressure was then increased at the rate of one inch per second until the seal failed. None of the EVA/saran control bags survived for more than 6 seconds during the test. The results are summarized in Tables I and II below;

TABLE I

| Bags of: irradiated EVA/saran/EVA | |
|---|---|
| Dose (MR) | Burst Pressure (Inches H$_2$O) |
| 0 | 18 |
| 0.5 | 20 |
| 0.8 | 22 |
| 1.2 | 24 |
| 1.6 | 20 |
| 2.0 | 31 |
| 4.6 | 33 |
| 5.3 | 33 |
| 8.3 | 33 |
| 9.7 | 32 |

TABLE II

| Bags of: EVA/saran | |
|---|---|
| Dose (MR) | Burst Pressure (Inches H$_2$O) |
| 2.5 | 9.6 |
| 4.1 | 12.4 |
| 6.8 | 17.1 |
| 8.6 | 21.1 |

From the data above it is evident that seal strength begins to improve even at low dosages and that in Table I the seal strength increases with dosage until a dosage of 2.0 MR is reached and after that point additional irradiation does not increase burst strength. In Table II a steady increase in burst strength is noted. As stated above none of the control bags in Table II survived more than 6 seconds or got to a burst pressure of 8 inches H$_2$O. Thus, the improvement brought about by irradiation is clearly demonstrated.

The irradiation in the tests herein was performed by an electron accelerator with elections having approximately 0.5 mev energy.

In another test, involving oriented, heat shrinkable laminates of Tables I and II the ability of the seals to withstand shrink tension at an elevated temperature was determined. This test is perhaps the most significant one for heat shrinkable materials as it is a prediction of package integrity under actual conditions such as shrinking in a heat tunnel. In this test a strip of film is cut from a bag so the heat seal extends transversely across the strip. Each end of the strip is held in a clamp, one clamp being fixed and the other being movable against a strain gauge. This test is essentially that for orientation release described in ASTM D-1504 except that the parameter of interest here was the length of time during which the seal could withstand the shrink tension of the material.

A summary of the results is set forth in Table III below:

TABLE III

| | | Elapsed Time to Seal Separation | |
|---|---|---|---|
| Laminate Structure | Temperature | Control (Unirradiated Seal) | Post Irradiated |
| Irr. EVA/Saran/EVA | 195° F | 6.0 seconds | 15+ seconds |
| Saran/EVA | 176° F | 0.5 seconds | 15+ seconds |

The temperatures are different in the above examples because the different laminates shrink at different temperatures. As can be seen the ability of the seals to resist delamination under shrink tensions at elevated temperature has dramatically increased.

A further demonstration of the improvement in seal strength was shown in a test which involved oriented, heat-shrinkable bags of the tubular saran/EVA laminate wherein one end of the tubular laminate is heat sealed to make a bag, the bag inflated a pressure of 85 p.s.i. and then closed with a metal clip. The bags were then sent through a commercial hot water shrink tunnel in water at 200° F. at a speed of 45ft./min. In this test the heat seals in 74 bags had been irradiated while the seals in 88 had not. None of the irradiated seals failed or showed evidence of delamination while only 10 of the unirradiated seals showed no evidence of delamination and 66 of the unirradiated seals showed either total separation or delamination of greater than 1/16 inch.

In another test, three laminate constructions in which each laminate had an ethylene vinyl acetate copolymer layer as the sealing layer were used in a test to determine the increase in seal strength which is achieved by irradiating the seal area. In this test, each seal area was irradiated to a dosage level of about 8 megarads. The results are set forth in Table IV below.

TABLE IV

| | | | | Average Values |
|---|---|---|---|---|
| Sample No. | Laminate Construction | Temp. Air | Control | Post Irradiated (Seal Only) |
| 1 | Irr. EVA/Saran/EVA | 73° F | 7.63 lb/in$^2$ | 8.13 lb/in$^2$ |
|   | Irr. EVA/Saran/EVA | 176° F | 2.63 lb/in$^2$ | 2.85 lb/in$^2$ |
| 2 | Saran/EVA | 73° F | 5.63 lb/in$^2$ | 7.21 lb/in$^2$ |
|   | Saran/EVA | 176° F | 0.48 lb/in$^2$ | 1.75 lb/in$^2$ |
| 3 | Irr. EVA/E-P | 73° F | 8.78 lb/in$^2$ | 11.55 lb/in$^2$ |

In Table IV the seal strengths were determined from one inch wide strips cut from the sealed together materials where the seal extended the width of the strip. The testing method was that described in "Tensile Properties of Thin Plastic Sheets", ASTM D882, part (a), where a constant rate of separation is used and the tensile strength at seal separation or break is considered to be the seal strength.

In Sample 1, the total thickness of the laminate was approximately 2.0 mils and the laminate was in the form of 8 inches diameter tubing wherein the irradiated EVA layer comprised the inner wall, saran the middle layer, and the unirradiated EVA the outer wall. This is the same construction as the Irr. EVA/saran/EVA laminates in the foregoing examples and Tables I-IV; and, in U.S. Pat. No. 3,741,253 which issued on June 26, 1973 to Harri J. Brax et al, there is a detailed description of a laminate of this type and the method of manufacturing same. The tubing was heat sealed to itself in the layflat condition so that the irradiated EVA layer sealed to itself. An increase in seal strength at both 73° F. and 176° F. over the control or unirradiated seal resulted.

In Sample 2, the total thickness of the laminate was 1.92 mils and the laminate was in the form of tubing wherein unirradiated EVA comprised the inner wall and saran comprised the outer wall. The saran/EVA laminates hereinabove in other examples are of the same construction and the EVA copolymer has a vinyl acetate content in the range of 18% to 19% by weight. A laminate of this type is further described in U.S. Pat. No. 3,625,348 which issued on Dec. 7, 1971 to Oliver R. Tichenal. The tubing was sealed to itself by heat while in a layflat position. An increase in seal strength resulted with significant improvement at the higher temperature level.

In Sample 3, the total thickness of the laminate was about 2.5 mils and, again, the laminate was in the form of tubing with the EVA layer being the inner wall and the E-P (ethylene-propylene copolymer) being the outer wall. This type of laminate and the method of producing it is described in more detail in U.S. Pat. No. 3,891,008 which issued on June 26, 1973 to Donald J. d'Entremont. The sealing was again by heat in the layflat condition and a substantial increase in seal strength again occurred.

The laminates of Samples 1 and 3 are heat shrinkable and the increase in seal strength is of particular importance since rupture of a seal as the film laminate shrinks around a product is made less likely.

Having thus described our invention, we claim:

1. An improved seal between thermoplastic sheets comprising:
   (a) two sheets of self-supporting thermoplastic film, said sheets comprising material selected from the group consisting of polyethylene and ethylene vinyl acetate copolymers;
   (b) a discrete seal between said sheets, said seal having been formed by the application of heat and pressure to said sheets without an adhesive therebetween; and,
   (c) the materials forming said seal being cross-linked by ionizing radiation to a dosage level of at least 2 MR greater than any other portion of said sheets.

2. The improved seal of claim 1 wherein said two sheets of thermoplastic film are the two walls of flattened thermoplastic tubing.